United States Patent
Schmiegel

Patent Number: 6,114,452
Date of Patent: Sep. 5, 2000

[54] PERFLUOROELASTOMER COMPOSITION HAVING EXCELLENT HEAT STABILITY

[75] Inventor: Walter Werner Schmiegel, Wilmington, Del.

[73] Assignee: E. I. du Pont de Nemours and Company, Wilmington, Del.

[21] Appl. No.: 09/105,813

[22] Filed: Jun. 26, 1998

Related U.S. Application Data

[63] Continuation-in-part of application No. 08/909,898, Aug. 12, 1997, Pat. No. 5,789,509, which is a continuation of application No. 08/755,946, Nov. 25, 1996, abandoned.

[51] Int. Cl.$^7$ ........................................... C08F 8/32
[52] U.S. Cl. ..................... 525/194; 525/217; 525/218; 525/326.3; 525/351; 525/374; 525/375; 525/380; 525/382; 525/387
[58] Field of Search ..................... 525/375, 374, 525/380, 382, 387, 194, 217, 218, 351

[56] References Cited

U.S. PATENT DOCUMENTS

| | | | |
|---|---|---|---|
| 2,946,763 | 7/1960 | Bro et al. | 260/45.5 |
| 3,085,083 | 4/1963 | Schreyer | 260/87.5 |
| 3,956,000 | 5/1976 | Kuhls et al. | 106/270 |
| 4,281,092 | 7/1981 | Breazeale | 526/247 |
| 4,394,489 | 7/1983 | Aufdermarsh | 525/370 |
| 4,525,539 | 6/1985 | Feiring | 525/326.3 |
| 4,713,418 | 12/1987 | Logothetis et al. | 525/200 |
| 4,879,362 | 11/1989 | Morgan | 526/247 |
| 5,051,479 | 9/1991 | Logothetis et al. | 525/197 |
| 5,285,002 | 2/1994 | Grootaert | 526/247 |
| 5,447,993 | 9/1995 | Logothetis | 525/272 |
| 5,677,389 | 10/1997 | Logothetis et al. | |
| 5,700,879 | 12/1997 | Yamamoto et al. | 525/353 |
| 5,767,204 | 6/1998 | Iwa et al. | 525/359.3 |
| 5,789,489 | 8/1998 | Coughlin et al. | 525/370 |

FOREIGN PATENT DOCUMENTS

| | | |
|---|---|---|
| 0129143 | 1/1984 | European Pat. Off. . |
| 0105445A | 4/1984 | European Pat. Off. . |
| 0220910 | 5/1987 | European Pat. Off. . |
| 0424555A | 5/1991 | European Pat. Off. . |
| 0457255 | 11/1991 | European Pat. Off. . |
| 0606883A1 | 7/1994 | European Pat. Off. . |
| 0648787 | 4/1995 | European Pat. Off. . |
| 63/210157 | 8/1988 | Japan . |
| 63-218715 | 9/1988 | Japan . |
| 398085 | 2/1966 | Switzerland . |
| 0953152 | 3/1964 | United Kingdom . |
| 95/22575 | 8/1995 | WIPO . |
| 97/19982 | 11/1997 | WIPO . |

*Primary Examiner*—Bernard Lipman

[57] ABSTRACT

Perfluoroelastomer compositions are provided which have excellent high temperature properties. The perfluoroelastomer component of the compositions are copolymers having a plurality of carbonyl-containing functional groups and copolymerized monomer units comprising a perfluoroolefin, a perfluoro(vinyl) ether and a nitrile-containing cure site monomer. The curative component is other than an organotin compound and includes peroxides, ammonium salts, aromatic amino compounds, bisamidrazones, and bisamidoximes.

39 Claims, No Drawings

PERFLUOROELASTOMER COMPOSITION HAVING EXCELLENT HEAT STABILITY

CROSS REFERENCE TO RELATED APPLICATIONS

This application is a continuation-in-part of U.S. Application No. 8/909,898, filed Aug. 12, 1997 U.S. Pat. No. 5,789,509 which is a continuation of U.S. application Ser. No. 08/755,946, filed Nov. 25, 1996now abandoned.

FIELD OF THE INVENTION

This invention relates to curable perfluoroelastomer compositions which, when cured, have outstanding thermal stability and chemical resistance.

BACKGROUND OF THE INVENTION

Perfluoroelastomers (elastomeric perfluoropolymers) are polymeric materials which exhibit outstanding high temperature tolerance and chemical resistance. Consequently, such compositions are particularly adapted for use as seals and gaskets in systems in which elevated temperatures and/or corrosive chemicals are encountered. The outstanding properties of perfluoropolymers are largely attributable to the stability and inertness of the copolymerized perfluorinated monomer units which make up the major portion of the polymer backbone, e.g., tetrafluoroethylene and perfluoro(alkyl vinyl) ethers. In order to completely develop elastomeric properties, perfluoropolymers are typically crosslinked, i.e. vulcanized. To this end, a small percentage of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092 and 4,394,489; and in International Application WO 95/22575.

A recently-developed class of perfluoroelastomers having carbonyl-containing functional groups is disclosed in co-pending U.S. patent application Ser. No. 08/908762. These polymers are characterized by having carbonyl-containing functional groups, including carboxyl groups, carboxylate groups, carboxamide groups, and mixtures thereof. Preferably, the carbonyl-containing functional groups are generated as a result of persulfate initiation of the polymerization reaction and the reaction is carried out in the absence of sulfite or bisulfite reducing agents. The carbonyl-containing perfluoroelastomers exhibit rapid cure rate when cured with organotin compounds. In certain applications, however, introduction of metal-containing compounds causes environmental concerns. It would therefore be useful to have available curable carbonyl-containing perfluoroelastomer compositions which contain non-metallic curatives.

SUMMARY OF THE INVENTION

The present invention provides curable compositions comprising (A) a perfluoroelastomer comprising copolymerized units of (1) a perfluoroolefin; (2) a perfluorovinyl ether selected from the group consisting of perfluoro(alkyl vinyl) ethers, perfluoro(alkoxy vinyl) ethers, and mixtures thereof; and (3) a cure site monomer having at least one nitrile group, selected from the group consisting of fluorinated olefins having at least one nitrile group, fluorinated vinyl ethers having at least one nitrile group, and mixtures thereof; wherein the perfluoroelastomer is characterized by i) having a plurality of carbonyl-containing endgroups selected from the group consisting of carboxyl endgroups, carboxylate endgroups, carboxamide endgroups, and mixtures thereof and ii) being substantially free of ionizable or ionized endgroups other than those having carbonyl-containing functional groups; and wherein the integrated absorbance ratio of the carbonyl-containing endgroups is greater than 0.1, the integrated absorbance ratio being determined by calculating the ratio of the integrated peak intensity within the range of 1620–1840 $cm^{-1}$ to that within the range of 2220–2740 $cm^{-1}$, as measured on a Fourier transform infrared spectrum of the perfluoroelastomer; and (B) about 0.1–10 parts by weight per hundred parts by weight perfluoroelastomer of a curing agent other than an organotin curing agent.

The invention is further directed to a curable perfluoroelastomer composition comprising (A) a perfluoroelastomer having a plurality of carbonyl-containing functional groups selected from the group consisting of carboxyl groups, carboxylate groups, and carboxamide groups, said perfluoroelastomer comprising copolymerized units of (1) a perfluoroolefin; (2) a perfluorovinyl ether selected from the group consisting of perfluoro(alkyl vinyl) ethers, perfluoro(alkoxy vinyl) ethers, and mixtures thereof; (3) a fluorinated comonomer selected from the group consisting of carboxyl-containing and carboxylate-containing comonomers, and (4) a cure site monomer having at least one nitrile group, selected from the group consisting of fluorinated olefins having nitrile groups, fluorinated vinyl ethers having at least one nitrile group and mixtures thereof wherein the integrated absorbance ratio of the carbonyl-containing functional groups is greater than 0.1, the absorbance ratio being determined by calculating the ratio of the integrated peak intensity within the range of 1620–1840 $cm^{-1}$ to that within the range of 2220–2740 $cm^{-1}$, as measured on a Fourier transform infrared spectrum of the perfluoroelastomer; and (B) about 0.1 to about 10 parts by weight per hundred parts by weight perfluoroelastomer of a curing agent other than an organotin curing agent.

DETAILED DESCRIPTION OF THE INVENTION

The perfluoroelastomer component of the compositions of the present invention comprises a perfluoroelastomer component having substantial levels of carbonyl-containing functional groups. Such perfluoroelastomers are disclosed in U.S. patent application Ser. No. 08/908762.

Perfluoroelastomers are polymeric compositions having copolymerized units of at least two principal perfluorinated monomers. Generally, one of the principal comonomers is a perfluoroolefin while the other is a perfluorovinyl ether. Representative perfluorinated olefins include tetrafluoroethylene and hexafluoropropylene. Suitable perfluorinated vinyl ethers are those of the formula

$$CF_2=CFO(R_fO)_n(R_{f'}O)_mR_f \qquad (I)$$

where $R_f$ and $R_{f'}$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl) ethers includes compositions of the formula

$$CF_2=CFO(CF_2CFXO)_nR_f \qquad (II)$$

where X is F or $CF_3$, n is 0–5, and $R_f$ is a perfluoroalkyl group of 1–6 carbon atoms.

Most preferred perfluoro(alkyl vinyl) ethers are those wherein n is 0 or 1 and $R_f$ contains 1–3 carbon atoms. Examples of such perfluorinated ethers include perfluoro (methyl vinyl) ether and perfluoro(propyl vinyl) ether. Other useful monomers include compounds of the formula $$CF_2=CFO[(CF_2)_mCF_2CFZO]_nR_f \quad (III)$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1. Additional perfluoro(alkyl vinyl) ether monomers include compounds of the formula $$CF_2=CFO[(CF_2CFCF_3O)_n(CF_2CF_2CF_2O)_m(CF_2)_p]C_xF_{2x+1} \quad (IV)$$

where m and n=1–10, p=0–3, and x=1–5.

Preferred members of this class include compounds where n=0–1, m=0–1, and x=1.

Examples of useful perfluoro(alkoxy vinyl) ethers include $$CF_2=CFOCF_2CF(CF_3)O(CF_2O)_mC_nF_{2n+1} \quad (V)$$

where n=1–5, m=1–3, and where, preferably, n=1.

Mixtures of perfluoro(alkyl vinyl) ethers and perfluoro (alkoxy vinyl) ethers may also be used.

Preferred copolymers are composed of tetrafluoroethylene and at least one perfluoro(alkyl vinyl) ether as principal monomer units. In such copolymers, the copolymerized perfluorinated ether units constitute from about 15–50 mole percent of total monomer units in the polymer.

Typically, the perfluoropolymer further contains copolymerized units of at least one cure site monomer, generally in amounts of from 0.1–5 mole percent. The range is preferably between 0.3–1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful cyano-substituted cure site monomers include those of the formulas shown below.

$$CF_2=CF\text{—}O(CF_2)_n\text{—}CN \quad (VI)$$

where n=2–12, preferably 2–6;

$$CF_2=CF\text{—}O[CF_2\text{—}CFCF_3\text{—}O]_n\text{—}CF_2\text{—}CFCF_3\text{—}CN \quad (VII)$$

where n=0–4, preferably 0–2;

$$CF_2=CF\text{—}[OCF_2CFCF_3]_x\text{—}O\text{—}(CF_2)_n\text{—}CN \quad (VIII)$$

where x=1–2, and n=1–4;

$$CF_2=CF\text{—}O\text{—}(CF_2)_n\text{—}O\text{—}CF(CF_3)CN \quad (IX)$$

where n=2–5; and $$CF_2=CF[OCF_2CF(CF_3)]_nCN \quad (X)$$

where n=1–5.

Those of formula (VM) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (XI)$$

i.e. perfluoro(8-cyano-5-methyl-3,6-dioxa-1-octene) or 8-CNVE.

Other cure site monomers include olefins represented by the formula $R_1CH=CR_2R_3$, wherein $R_1$ and $R_2$ are independently selected from hydrogen and fluorine and $R_3$ is independently selected from hydrogen, fluorine, alkyl, and perfluoroalkyl. The perfluoroalkyl group may contain up to about 12 carbon atoms. However, perfluoroalkyl groups of up to 4 carbon atoms are preferred. In addition, the curesite monomer preferably has no more than three hydrogen atoms. Examples of such olefins include ethylene, vinylidene fluoride, vinyl fluoride, trifluoroethylene, 1-hydropentafluoropropene, and 2-hydropentafluoropropene.

An especially preferred perfluoroelastomer contains 53.0–79.9 mole percent tetrafluoroethylene, 20.0–46.9 mole percent perfluoro(methyl vinyl) ether and 0.4 to 1.5 mole percent nitrile-containing cure site monomer.

Any carbonyl-containing functional groups present in the perfluoroelastomers of this invention are either present as polymer endgroups or as pendant functionalities introduced as a result of copolymerization of fluorinated carbonyl-containing comonomers. By carbonyl-containing comonomer is meant a fluorinated monomer having a copolymerizable double bond and at least one pendant carboxylic acid group (including salts thereof), pendant carboxylic acid ester group, or pendant carboxamide group. Such comonomers are represented by compounds represented by formulas (XII) and (XIII):

$$CF_2=CFO(CF_2)_nX \quad (XII)$$

$$CF_2=CFO[CF_2CF(CF_3)O]_n(CF_2)_xX \quad (XIII)$$

where n=1–4, x=2–5, and

X=$CO_2H$, $CO_2^-$, $CONH_2$, or $CO_2CH_3$

Depending on the carbonyl-containing comonomer selected, the resulting polymer would have carboxyl, carboxylate, or carboxamide (i.e. carboxylic acid amide) groups at any point on the chain, i.e. at the chain end, within the chain, or both.

Perfluoroelastomers having carboxyl or carboxylate endgroups can be prepared by polymerization of mixtures of perfluoroolefins and perfluorovinyl ethers in the presence of a free radical generating initiator either in bulk, in solution in an inert solvent, in aqueous suspension, or in aqueous emulsion. Perfluoroelastomer polymerization techniques are described in general in Logothetis, *Prog. Polymn. Sci*, Vol. 14, 252–296 (1989) and in co-pending U.S. patent application Ser. No. Unknown, filed as case designation AD-6425 and entitled "Fast-curing Perfluoroelastomer Composition," filed Nov. 25, 1996. The Logothetis article discloses, among others, a method of polymerization which involves initiation by persulfates, such as ammonium or potassium persulfate, in the absence of a reducing agent. Thermally initiated free-radical polymerization using persulfates in the absence of a reducing agent results in the production of polymers having carboxylic acid end groups which ionize to form carboxylate groups. Reducing agents include such compounds as sodium sulfite and sodium hydrogen sulfite.

As described in co-pending U.S. patent application Ser. No. 08/755919, carboxylated polymers having superior cure characteristics may be obtained by copolymerizing perfluoroolefins and perfluorovinyl ethers by initiating the copolymerization reaction with ammonium persulfate, in the absence of a reducing agent, in aqueous emulsion in a continuous well-stirred reactor with a residence time of 2–4 hours, at a temperature of 75° C.–90° C. and at a pressure of 2–8 MPa. Preferably the residence time is between 3.0–3.7 hours, the temperature is 80° C.–85° C., and the pressure is 6.0–8.0 MPa. If levels of reducing agent above 5 mole percent, based on ammonium persulfate, are present, then the amount of sulfonate endgroups reaches a level which has detrimental effects on processability. In addition, in order to obtain the fast cure rates typical of the compositions disclosed, the pH of the polymerization reaction mixture is generally between 3.5–7.0. Tetrafluoroethylene and perfluoro(methyl vinyl) ether monomers are preferred and are fed by compressor. If a cure site monomer is used, it is preferably fed by liquid metering pump or by a compressor. This polymerization method results in production of a perfluoroelastomer copolymer composition having a significant proportion of carboxyl-containing endgroups, carboxylate-containing endgroups, carboxamide endgroups, or mixtures thereof. The number of carboxyl, carboxylate, and carboxamide groups present in the nitrile-containing perfluoroelastomers accounts for the carbonyl content and is related to the ratio of radicals generated to polymerization rate. Specifically, the ratio of the radical generation rate, calculated from persulfate thermal decomposition kinetics, to the polymerization rate provides a measure of the carbonyl content of the polymer. Thermal decomposition rates for persulfate are correlated in F. A. Bovey, et al., "Emulsion Polymerization", Interscience Publishers, New York, 1955. At 85° C., the first order decomposition rate coefficient is 0.011/minute. For a continuous stirred tank reactor at 85° C. and a residence time of 218 minutes, about 70% of persulfate fed would decompose to produce a radical flux $R_i$ (mmol/hour) of sulfate radicals equal to 1.4 times the persulfate fed (mmol/hour). Actual initiator efficiency could be significantly less than that assumed in this calculation, depending on polymer conditions and type of monomer involved. The polymerization rate $R_p$ (kg/hour) is readily measured, so that the ratio $R_i/R_p$ can be calculated for correlation with the observed carboxylate levels. Generally, for purposes of the present invention, the ratio $R_i/R_p$ should be in the range of about 10–50 mmol/kg, preferably 20–40 mmol/kg.

Carbonyl-containing functional groups may also be introduced by copolymerization of fluorinated carboxyl-containing comonomers with the principal perfluoroolefins and perfluorovinyl ether comonomers. Cure site monomers may also be copolymerized into the polymer as well. Such copolymerizations may be conducted substantially as described above. If the sole initiator is a persulfate salt, then carbonyl-containing endgroups will also result. If a sulfite or bisulfite reducing agent is additionally present, then the resultant copolymers will contain sulfonic acid or sulfonate endgroups and carboxyl or carboxylate groups.

The polymer emulsion, upon exiting the reactor, is coagulated with an aqueous solution of a multivalent metal salt, such as magnesium sulfate. The coagulated polymer is then washed with deionized water and dried at 70°–100° C. in a circulating air oven. As the composition leaves the reactor, some monomer is released from the polymer as a result of the rapid lowering of pressure on the reaction mixture, resulting in production of foam in some instances. A number of factors influence the amount of foam produced. For example, the amount of unreacted monomer which remains in the polymerization mixture, type and amount of surfactant used, pH of the composition, and type of base or buffer utilized to adjust the pH of the reaction mixture all influence whether undesirable amounts of foam result. Foaming may be prevented or reduced by adjustment of these variables or by the addition of a defoaming agent to the aqueous elastomer composition after the polymerization mixture exits the reactor. Common defoaming agents include silicone-based defoamers, as supplied for instance by Dow Coming. In addition, alcoholic defoaming agents, such as heptanol or octanol may be used.

The carbonyl content of the perfluoroelastomers of the invention may be determined by an integrated absorbance ratio method based on Fourier transform infrared analysis. Specifically, the total content of carboxyl, carboxylate, and carboxamide groups in the polymer is determined by measuring the integrated carbonyl absorbance (i.e. the total area of all peaks in the region 1620–1840 cm$^{-1}$) of thin polymer films using a Fourier transform IR spectrometer. In order to compare the carbonyl level in different polymer samples, integrated absorbance was normalized for differences in polymer film thickness by taking the ratio of the carbonyl integrated absorbance to the thickness band integrated absorbance. Thickness band integrated absorbance was the total area of all peaks in the region 2200–2740 cm$^{-1}$. The integrated absorbance of peaks in the latter region is proportional to the thickness of the polymer film. The integrated absorbance ratio can be readily used to calculate the concentration of carbonyl groups in the polymer by comparing the integrated absorbance ratio of the polymer to that of a standard polymer of known carboxyl or carboxylate content. Such standards may be prepared from polymers of this invention which have been heated in order to completely decarboxylate them, as described in co-pending U.S. patent application Ser. No. Unknown, filed as case designation AD-6425 and entitled "Fast-curing Perfluoroelastomer Composition," filed Nov. 25, 1996. Known amounts of a carbonyl-containing compound such as ammonium perfluorooctanoate may then be added to the substantially completely decarboxylated polymer in order to produce a calibration curve of integrated absorbance ratio versus concentration of ammonium perfluorooctanoate.

The perfluoroelastomer compositions of this invention also include a curing agent which is other than an organotin compound.

A preferred cure system, useful for perfluoroelastomers containing nitrile-containing curesites utilizes bis (aminophenols) and bis(aminothiophenols) of the formulas

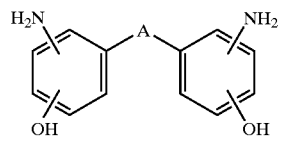

(XIV)

and tetraamines of the formula

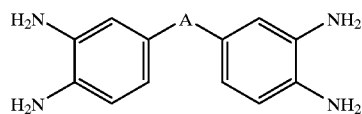

(XVI)

where A is $SO_2$, O, CO, alkyl of 1–6 carbon atoms, perfluoroalkyl of 1–10 carbon atoms, or a carbon-carbon bond linking the two aromatic rings. The amino and hydroxyl groups in formulas XIV and XV above, are interchangeably in the meta and para positions with respect to the group A. Preferably, the curing agent is a compound selected from the group consisting of 2,2-bis[3-amino-4-hydroxyphenyl]

hexafluoropropane; 4,4'-sulfonylbis(2-aminophenol); 3,3'-diaminobenzidine; and 3,3', 4,4'-tetraaminobenzophenone. The first of these preferred curing agents will be referred to as diaminobisphenol AF. The curing agents can be prepared as disclosed in U.S. Pat. No. 3,332,907 to Angelo. Diaminobisphenol AF can be prepared by nitration of 4,4'-[2,2,2-trifluoro-1-(trifluoromethyl)ethylidene]bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. Of the members of the preferred class, a particularly preferred compound is 3,3'-diaminobenzidine. Carboxylated perfluoroelastomers cured in the presence of 3,3'-diaminobenzidine show unusually good solvent resistance, as evidenced by greater resistance to volume swell in certain solvents compared to perfluoroelastomers cured in the presence of other agents. The level of curing agent should be chosen to optimize the desired properties of the vulcanizate. In general, a slight excess of curing agent over the amount required to react with all the cure sites present in the polymer is used. Typically, 0.5–5.0 parts by weight of the curative per 100 parts of polymer is required. The preferred range is 1.0–2.5 parts.

Peroxides may also be utilized as curing agents. Useful peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di (tertiarybutylperoxy)hexyne-3 and 2,5-dimethyl-2,5-di (tertiarybutylperoxy)hexane. Other peroxides can be selected from such compounds as dicumyl peroxide, dibenzoyl peroxide, tertiarybutyl perbenzoate, and di[1,3-dimethyl-3-(t-butylperoxy)-butyl]carbonate. Generally, about 1–3 parts of peroxide per 100 parts of perfluoroelastomer is used. Another material which is usually blended with the composition as a part of the peroxide curative system is a coagent composed of a polyunsaturated compound which is capable of cooperating with the peroxide to provide a useful cure. These coagents can be added in an amount equal to 0.1 and 10 parts per hundred parts perfluoroelastomer, preferably between 2–5 parts per hundred parts perfluoroelastomer. The coagent may be one or more of the following compounds: triallyl cyanurate; triallyl isocyanurate; tri(methylallyl) isocyanurate; tris (diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful are triallyl isocyanurate and trimethylallyl isocyanurate.

Bisamidrazone compounds, for example, 2,2-bis(4-carboxyphenyl)hexafluoropropane bisamidrazone, and bisamidrazones of the general formula (XVII)

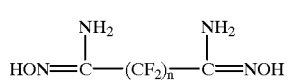

where $R_f$ is one of the following groups:
$(CF_2)n$,
where n=1 to 10;
$CFX(OCF_2CFX)_nO(CF_2)_m$,
where X=F or $CF_3$, n=1 to 10, m=1 to 2, and $CFX(OCF_2CFX)_pO(CF_2)_nO(CFXCF_2O)_qCFX$, where X=F or $CF_3$, n=1 to 10, p+q=8 are also effective curing agents for perfluoroelastomers containing cure site monomers having at least one nitrile group and may be utilized as curatives in the compositions of the present invention. Curable fluoroelastomer compositions containing bisamidrazones are disclosed in U.S. Pat. Nos. 5,605,973 and 5,637,648. About 0.1 to about 5 parts by weight per 100 parts fluoroelastomer is generally sufficient to effect cure.

Bisamidoximes may also be utilized as curing agents in the compositions of the invention. For example, bisamidoximes of the general formula (XVIII)

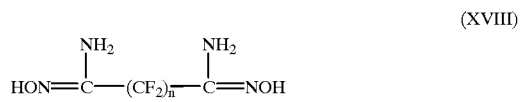

where n is an integer of 1 to 10, are suitable curatives. Bisamidoximes of formula XVIII may be readily prepared by reaction of a dinitrile compound with hydroxylamine, as described in U.S. Pat. No. 5,668,221. Generally, about 0.1 to 5 parts of bisamidoxime per 100 parts perfluoroelastomer is utilized in curable compositions.

In addition, ammonium salts of organic and inorganic acids may be used as curing agents. Suitable ammonium salts and quantities effective for curing perfluoroelastomers are disclosed in U.S. Pat. No. 5,565,512. A particularly effective curing agent of this type is ammonium perfluorooctanoate.

Depending on the cure site monomers present, it is also possible to use a dual cure system. For example, perfluoroelastomers having copolymerized units of nitrile-containing cure site monomers can be cured using a curative comprising a mixture of a peroxide in combination with an organotin curative and a coagent. Generally, 0.3–5 parts of peroxide, 0.3–5 parts of coagent, and 0.1–10 parts of organotin curative are utilized.

Additives, such as carbon black, stabilizers, plasticizers, lubricants, fillers, such as titanium dioxide, silica, and barium sulfate, and processing aids typically utilized in perfluoroelastomer compounding can be incorporated into the compositions of the present invention, provided they have adequate stability for the intended service conditions. In particular, low temperature performance can be enhanced by incorporation of perfluoropolyethers.

Carbon black fillers are used in elastomers as a means to balance modulus, tensile strength, elongation, hardness, abrasion resistance, conductivity, and processability of the compositions. In perfluoroelastomer compositions, small particle size, high surface area carbon blacks have been the fillers of choice. Commonly chosen grades of carbon black include SAF carbon black, a highly reinforcing black with typical average particle size of about 14 nm and designated N 110 in Group No. 1, according to ASTM D-1765, and MT carbon black. Particularly useful carbon blacks are those described in WO 95/22575. These particular carbon blacks have average particle sizes of at least about 100 nm to about 500 nm as determined by ASTM D-3849. Examples include MT blacks (medium thermal black) designated N-991, N-990, N-908, and N-907, and large particle size furnace blacks. MT blacks are preferred. When used, 1–70 phr of large size particle black is generally sufficient, and this amount does not retard cure time.

In addition, fluoropolymer fillers may also be present in the composition. Generally from 1 to 50 parts per hundred perfluoroelastomer of a fluoropolymer filler is used, and preferably at least about 5 parts per hundred parts perfluoroelastomer is present. The fluoropolymer filler can be any finely divided, easily dispersed plastic fluoropolymer that is solid at the highest temperature utilized in fabrication and curing of the perfluoroelastomer composition. By solid, it is meant that the fluoroplastic, if partially crystalline, will have a crystalline melting temperature above the processing temperature(s) of the perfluoroelastomer(s). Such finely divided, easily dispersed fluoroplastics are commonly called micropowders or fluoroadditives. Micropowders are ordinarily partially crystalline polymers.

Micropowders that can be used in the composition of the invention include, but are not limited to, those based on the group of polymers known as tetrafluoroethylene (TFE) polymers. This group includes homopolymers of TFE (PTFE) and copolymers of TFE with such small concentrations of at least one copolymerizable modifying monomer that the resins remain non-melt-fabricable (modified PTFE). The modifying monomer can be, for example, hexafluoropropylene (HFP), perfluoro(propyl vinyl) ether (PPVE), perfluorobutyl ethylene, chlorotrifluoroethylene, or another monomer that introduces side groups into the polymer molecule. The concentration of such copolymerized modifiers in the polymer is usually less than 1 mole percent. The PTFE and modified PTFE resins that can be used in this invention include both those derived from suspension polymerization and from emulsion polymerization.

High molecular weight PTFE used in production of micropowder is usually subjected to ionizing radiation to reduce molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecular weight in the emulsion polymerization process, such as disclosed by Kuhls et al. in U.S. Pat. No. 3,956,000. Morgan, in U.S. Pat. No. 4,879,362, discloses a non-melt-fabricable, non-fibrillating modified PTFE produced by the emulsion (dispersion) polymerization process. This polymer forms platelets on shear blending into elastomeric compositions, instead of fibrillating.

TFE polymers also include melt-fabricable copolymers of TFE having sufficient concentrations of copolymerized units of one or more monomers to reduce the melting point significantly below that of PTFE. Such copolymers generally have melt viscosity in the range of $0.5-60\times10^3$ Pa.s, but viscosities outside this range are known. Perfluoroolefins and perfluoro(alkyl vinyl) ethers are preferred comonomers. Hexafluoropropylene and perfluoro(propyl vinyl) ether are most preferred. Melt fabricable TFE copolymers such as FEP (TFE/hexafluoropropylene copolymer) and PFA [TFE/perfluoro(propyl vinyl)ether copolymer] can be used, provided they satisfy constraints on melting temperature with respect to perfluoroelastomer processing temperature. These copolymers can be utilized in powder form as isolated from the polymerization medium, if particle size is acceptable, or they can be ground to suitable particle size starting with stock of larger dimensions.

The curable compositions of the present invention are useful in production of gaskets, tubing, and seals. Such articles are produced by molding a compounded formulation of the curable composition with various additives under pressure, curing the part, and then subjecting it to a post cure cycle. The cured compositions have excellent thermal stability and chemical resistance. They are particularly useful in applications such as seals and gaskets for manufacturing semiconductor devices, for use in the chemical processing industry, and in seals for high temperature automotive uses.

The invention is now illustrated by certain embodiments wherein all parts are by weight unless otherwise specified.

EXAMPLES

TEST METHODS

Cure Characteristics

Cure characteristics were measured using a Monsanto oscillating disk rheometer (ODR), under conditions corresponding to ASTM D 2084. The following cure parameters were recorded:

$M_{max}$: maximum torque level, in units of N.m $M_{min}$: minimum torque level, in units of N.m $M_{max}-M_{min}$ difference between maximum and minimum torque, in units of N.m $t_c90$: minutes to 90% of maximum torque Stress/strain properties were measured according to ASTM D 412. The following parameters were recorded:

$M_{100}$ modulus at 100% elongation in units of MPa $T_B$ tensile strength at break in units of MPa.

$E_B$ elongation at break in units of %

Compression set of O-ring samples or pellet samples was determined in accordance with ASTM D 395.

Example 1

A perfluoroelastomer terpolymer having copolymerized units of approximately 54.8 wt. % tetrafluoroethylene (TFE), 43 wt. % perfluoro(methyl vinyl) ether (PMVE) and 2.2 wt. % perfluoro(8-cyano-5-methyl-3,6-dioxa-1-octene) (8-CNVE), having an inherent viscosity of 0.53 dl/g (as measured by dissolving 0.2 g of polymer in 100 ml of a mixed solvent of 60/40/3 volume ratio of heptafluoro-2,2,3-trichlorobutane, perfluoro($\alpha$-butyltetrahydrofuran)and ethylene glycol dimethyl ether at 30° C.), and an integrated absorbance ratio of 0.46 was used in this Example.

The perfluoroelastomer terpolymer was prepared by aqueous emulsion polymerization at 85° C. and approximately 600 psi (4.1 MPa) in a continuous reactor with agitation. The surfactant for the polymerization was ammonium perfluorooctanoate and the sole initiator was ammonium persulfate. TFE and PMVE monomers were fed from compressors and liquid cure site monomer, 8-CNVE, was fed neat from a high pressure metering pump. A buffering salt, disodium hydrogen phosphate, was present to control the pH in the range 4.5–6.5 to counteract acidity generated by persulfate decomposition. Upon exiting the reactor, the polymer emulsion was coagulated with an aqueous solution of magnesium sulfate. The coagulated polymer was then washed with deionized water and dried in a circulating air oven at 80° C. for 48 hours to form a polymer crumb having Mooney Viscosity (ML-10@ 121° C.) of 116.

The polymer crumb was then compounded with 30 phr medium thermal carbon black (MT black) and 1.0 phr diaminobisphenol AF curative on a rubber mill to produce a curable composition of this invention. Cure response was determined by ODR, according to ASTM D 2084. Results are shown in Table I.

TABLE I

| ODR | Compounded Polymer |
|---|---|
| $M_{max}$ (N.m) | 4.1 |
| $M_{min}$ (N.m) | 0.7 |
| $M_{max}-M_{min}$ (N.m) | 3.4 |
| $T_c90$ (minutes) | 12.0 |

Example 2

Polymer 2, a blend of five perfluoroelastomer samples having the same aim composition and containing copolymerized units of tetrafluoroethylene, perfluoro(methyl vinyl) ether, and perfluoro-8(cyano-5-methyl-3,6-dioxa-1-octene) in a molar ratio of approximately 69.2/30.0/0.7, respectively, was prepared generally as described in Example 1 to yield a polymer having an inherent viscosity of 0.43dl/g. Samples of Polymer 2 were then compounded with SAF N110 carbon black and 3,3'-diaminobenzidine curative, in the ratios shown in Table II, on a rubber mill to produce curable compositions of the invention identified as Samples 2A–2D. Stress/strain properties were measured on test specimens which had been died out of polymer sheet that had been press-cured at 210° C. for 20 minutes, then post-cured in an oven under a nitrogen atmosphere for 48 hours using a programmed heating cycle wherein the temperature was increased from ambient temperature to 305° C. Compression set of cured pellet samples was measured after the cured pellets, compressed 25%, had been heated at 204° C. for 70 hours. Results are shown in Table II. In addition, percent volume swell of type AS-568A size 214 O-ring test specimens made of cured Sample 2A–2D compositions which had been exposed to water at 225° C. for 70 hours and to ethylenediamine at 90° C. for 70 hours are reported in Table II.

A comparative perfluoroelastomer composition, Sample 2E, was prepared by compounding a sample of Polymer 2 with SAF N110 carbon black and tetraphenyltin curative on a rubber mill, in the ratios shown in Table II. Physical properties and percent volume swell in water and ethylenediamine were determined as for Samples 2A–2D. Results are shown in Table II.

TABLE II

|  | 2A | 2B | 2C | 2D | 2E |
|---|---|---|---|---|---|
| Ingredient (phr) | | | | | |
| Polymer 2 | 100 | 100 | 100 | 100 | 100 |
| Carbon Black | 12 | 12 | 12 | 12 | 12 |
| 3,3'-Diaminobenzidine | 2.0 | 1.5 | 1.0 | 0.5 | — |
| Tetraphenyltin | — | — | — | — | 3.0 |
| Physical Properties | | | | | |
| $M_{100}$ (MPa) | 11.8 | 8.0 | 8.5 | 5.6 | 6.8 |
| $T_B$ (MPa) | 16.7 | 16.8 | 15.5 | 11.3 | 16.3 |
| $E_B$ (%) | 139 | 210 | 194 | 207 | 166 |
| Compression Set | 27 | 33 | 57.6 | 90.9 | 13 |
| Volume Swell | | | | | |
| Water (70 hrs., 225° C.) | 7 | 9 | 24 | 39 | 14 |
| Ethylenediamine (70 hrs., 90° C). | 11.6 | 18 | 19 | 21 | 27 |

Example 3

A sample of the perfluoroelastomer of Example 2 was compounded with SAF N110 carbon black and diaminobisphenol AF curative, in the ratio shown in Table III, on a rubber mill to produce a curable composition of the invention identified as Sample 3. Stress/strain properties were measured on test specimens which had been died out of polymer sheet that had been press-cured at 210° C. for 20 minutes, then post-cured in an oven under a nitrogen atmosphere for 48 hours using a programmed heating cycle wherein the temperature is increased from ambient temperature to 305° C. Compression set of cured pellet samples was measured after the cured pellets, compressed 25%, had been heated at 204° C. for 70 hours. Results are shown in Table III. In addition, percent volume swell of type AS-568A size 214 O-ring test specimens of cured Sample 3 compositions which had been exposed to water at 225° C. for 70 hours and to ethylenediamine at 90° C. for 70 hours are reported in Table III.

TABLE III

|  | Sample 3 |
|---|---|
| Ingredient (phr) | |
| Polymer of Example 2 | 100 |
| Carbon Black | 12 |
| Bis(aminobisphenol) AF | 1.5 |
| Physical Properties | |
| $M_{100}$ (MPa) | 7.1 |
| $T_B$ (MPa) | 13.8 |
| $E_B$ (%) | 168 |
| Compression Set | 39 |
| Volume Swell | |
| Water (70 hrs., 225° C.) | 21 |
| Ethylenediamine (70 hrs., 90° C.) | 30 |

What is claimed is:

1. A curable perfluoroelastomer composition comprising
   (A) a perfluoroelastomer comprising copolymerized units of (1) a perfluoroolefin; (2) a perfluorovinyl ether selected from the group consisting of perfluoro(alkyl vinyl) ethers, perfluoro(alkoxy vinyl) ethers, and mixtures thereof; and (3) a cure site monomer having at least one nitrile group, selected from the group consisting of fluorinated olefins having at least one nitrile group, fluorinated vinyl ethers having at least one nitrile group, and mixtures thereof; wherein the perfluoroelastomer is characterized by i) having a plurality of carbonyl-containing endgroups selected from the group consisting of carboxyl endgroups, carboxylate endgroups, carboxamide endgroups, and mixtures thereof and ii) being substantially free of ionizable or ionized endgroups other than those having carbonyl-containing functional groups; and wherein the integrated absorbance ratio of the carbonyl-containing endgroups is greater than 0.1, the integrated absorbance ratio being determined by calculating the ratio of the integrated peak intensity within the range of 1620–1840 cm$^{-1}$ to that within the range of 2220–2740 cm$^{-1}$, as measured on a Fourier transform infrared spectrum of the perfluoroelastomer; and
   (B) about 0.1 to about 10 parts by weight per hundred parts by weight perfluoroelastomer of a curing agent other than an organotin curing agent.

2. A composition of claim 1 wherein the perfluorovinyl ether is a perfluoro(alkyl vinyl) ether.

3. A composition of claim 2 wherein the perfluoro(alkyl vinyl) ether is perfluoro(methyl vinyl) ether.

4. A composition of claim 1 wherein the perfluorovinyl ether is a perfluoro(alkoxy vinyl) ether.

5. A composition of claim 1 wherein the cure site monomer is a nitrile-containing fluorinated vinyl ether.

6. A composition of claim 1 wherein the nitrile-containing fluorinated vinyl ether is perfluoro(8-cyano-5-methyl-3,6-dioxa-1-octene).

7. A composition of claim 5 wherein the nitrile-containing fluorinated vinyl ether is a compound of the formula

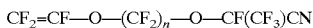

$$CF_2=CF-O-(CF_2)_n-O-CF(CF_3)CN$$

where n=2–5.

8. A composition of claim 5 wherein the nitrile-containing fluorinated vinyl ether is a compound of the formula

$$CF_2=CF[OCF_2CF(CF_3)]_nCN$$

where n=1–5.

9. A composition of claim 1 wherein the curing agent is selected from the group consisting of compounds of the formulae

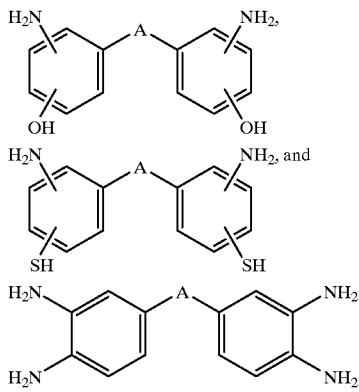

where A is $SO_2$, O, CO, alkyl of 1–6 carbon atoms, perfluoroalkyl of 1–10 carbon atoms, or a carbon-carbon bond linking the two aromatic rings.

10. A composition of claim 9 wherein said curing agent is 2,2-bis [3-amino-4-hydroxyphenyl]hexafluoropropane.

11. A composition of claim 9 wherein said curing agent is 4,4'-sulfonylbis(2-aminophenol).

12. A composition of claim 9 wherein said curing agent is 3,3'-diaminobenzidine.

13. A composition of claim 9 wherein said curing agent is 3,3', 4,4'-tetraaminobenzophenone.

14. A composition of claim 1 wherein said curing agent is selected from the group consisting of ammonium salts of organic and inorganic acids.

15. A composition of claim 1 wherein said curing agent is selected from the group consisting of dialkyl peroxides, and bis(dialkyl peroxides).

16. A composition of claim 1 wherein said curing agent is a bisamidrazone compound.

17. A composition of claim 1 wherein said curing agent is a bisamidoxime.

18. A composition of claim 1 further comprising a second perfluoroelastomer having ionized or ionizable endgroups.

19. A composition of claim 1 further comprising a second perfluoroelastomer selected from the group consisting of perfluoroelastomers having bromine-containing groups and perfluoroelastomers having iodine-containing groups.

20. A composition of claim 1 wherein the perfluoroelastomer comprises copolymerized units of tetrafluoroethylene, perfluoro(methyl vinyl) ether, and perfluoro(8-cyano-5-methyl-3,6-dioxa-1-octene).

21. A curable perfluoroelastomer composition comprising (A) a perfluoroelastomer having a plurality of carbonyl-containing functional groups selected from the group consisting of carboxyl groups, carboxylate groups, and carboxamide groups, said perfluoroelastomer comprising copolymerized units of (1) a perfluoroolefin; (2) a perfluorovinyl ether selected from the group consisting of perfluoro(alkyl vinyl ) ethers , perfluoro(alkoxy vinyl) ethers, and mixtures thereof, (3) a fluorinated comonomer selected from the group consisting of carboxyl-containing and carboxylate-containing comonomers, and (4) a cure site monomer having at least one nitrile group, selected from the group consisting of fluorinated olefins having nitrile groups, fluorinated vinyl ethers having at least one nitrile group and mixtures thereof wherein the integrated absorbance ratio of the carbonyl-containing functional groups is greater than 0.1, the absorbance ratio being determined by calculating the ratio of the integrated peak intensity within the range of 1620–1840 $cm^{-1}$ to that within the range of 2220–2740 $cm^{-1}$, as measured on a Fourier transform infrared spectrum of the perfluoroelastomer; and (B) about 0.1 to about 10 parts by weight per hundred parts by weight perfluoroelastomer of a curing agent other than an organotin curing agent.

22. A composition of claim 21 wherein the perfluorovinyl ether is a perfluoro(alkyl vinyl) ether.

23. A composition of claim 22 wherein the perfluoro(alkyl vinyl) ether is perfluoro(methyl vinyl) ether.

24. A composition of claim 21 wherein the perfluorovinyl ether is a perfluoro(alkoxy vinyl) ether.

25. A composition of claim 21 wherein the cure site monomer is a nitrile-containing fluorinated vinyl ether.

26. A composition of claim 25 wherein the nitrile-containing fluorinated vinyl ether is perfluoro(8-cyano-5-methyl-3,6-dioxa-1-octene).

27. A composition of claim 25 wherein the nitrile-containing fluorinated vinyl ether is a compound of the formula

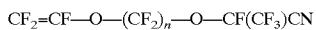

$$CF_2=CF-O-(CF_2)_n-O-CF(CF_3)CN$$

where n=2–5.

28. A composition of claim 25 wherein the nitrile-containing fluorinated vinyl ether is a compound of the formula

$$CF_2=CF[OCF_2CF(CF_3)]_nCN$$

where n=1–5.

29. A composition of claim 21 wherein the curing agent is selected from the group consisting of compounds of the formulae

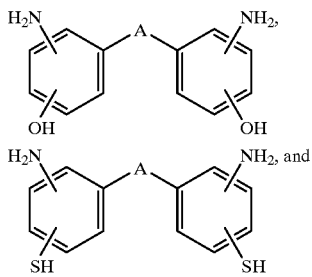

-continued

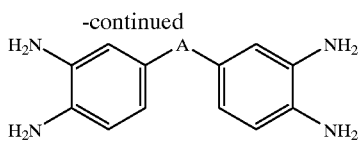

where A is $SO_2$, O, CO, alkyl of 1–6 carbon atoms, perfluoroalkyl of 1–10 carbon atoms, or a carbon-carbon bond linking the two aromatic rings.

30. A composition of claim 29 wherein said curing agent is 2,2-bis[3-amino-4-hydroxyphenyl]hexafluoropropane.

31. A composition of claim 29 wherein said curing agent is 4,4'-sulfonylbis(2-aminophenol).

32. A composition of claim 29 wherein said curing agent is 3,3'-diaminobenzidine.

33. A composition of claim 29 wherein said curing agent is 3,3', 4,4'-tetraaminobenzophenone.

34. A composition of claim 21 wherein said curing agent is selected from the group consisting of ammonium salts of organic and inorganic acids, dialkyl peroxides, and bis(dialkyl peroxides).

35. A composition of claim 21 wherein said curing agent is a bisamidrazone compound.

36. A composition of claim 21 wherein said curing agent is a bisamidoxime.

37. A composition of claim 21 further comprising a second perfluoroelastomer having ionized or ionizable end-groups.

38. A composition of claim 21 further comprising a second perfluoroelastomer selected from the group consisting of perfluoroelastomers having bromine-containing groups and perfluoroelastomers having iodine-containing groups.

39. A composition of claim 21 wherein the perfluoroelastomer comprises copolymerized units of tetrafluoroethylene, perfluoro(methyl vinyl) ether, and perfluoro(8-cyano-5-methyl-3,6-dioxa- 1 -octene).

* * * * *